United States Patent [19]
Krause

[11] 3,877,534
[45] Apr. 15, 1975

[54] SNOWMOBILE TRACK SUSPENSION SYSTEM
[75] Inventor: Thomas J. Krause, Menomonee Falls, Wis.
[73] Assignee: Outboard Marine Corporation, Waukegan, Ill.
[22] Filed: Mar. 26, 1973
[21] Appl. No.: 344,859

[52] U.S. Cl.............................. 180/5 R; 180/9.2 R
[51] Int. Cl............................................ B62m 27/02
[58] Field of Search.............. 180/5 R, 9.24 A, 9.54, 180/9.5; 305/27

[56] References Cited
UNITED STATES PATENTS

| | | | |
|---|---|---|---|
| 1,894,619 | 1/1933 | Knickerbocker.................. | 180/5 R |
| 2,925,873 | 2/1960 | Laporte............................. | 180/5 R |
| 3,362,492 | 1/1968 | Hansen ........................ | 180/9.2 R X |
| 3,404,745 | 10/1968 | Smieja................................ | 180/5 R |
| 3,446,303 | 5/1969 | Trapp ................................ | 180/9.5 |
| 3,703,936 | 11/1972 | Padwick............................. | 180/5 R |
| 3,707,198 | 12/1972 | Pierson ............................. | 180/5 R |
| 3,774,706 | 11/1973 | Kiekhaefer......................... | 180/5 R |

*Primary Examiner*—Philip Goodman
*Attorney, Agent, or Firm*—Michael, Best & Friedrich

[57] ABSTRACT

Disclosed herein is a snowmobile comprising a track suspension system including a frame having a forward portion pivotally mounted from a snowmobile chassis about the axis of a sprocket bearing drive shaft, resilient energy absorption means connecting the rearward portion of the frame to the chassis for control of pivotal movement of the frame to the chassis, together with means rotatably supporting an idler bogie on the rearward portion of the frame, and means pivotally mounting a plurality of intermediate bogies from the frame in spaced relation to each other lengthwise of the frame for rotative movement independently of the frame.

5 Claims, 2 Drawing Figures

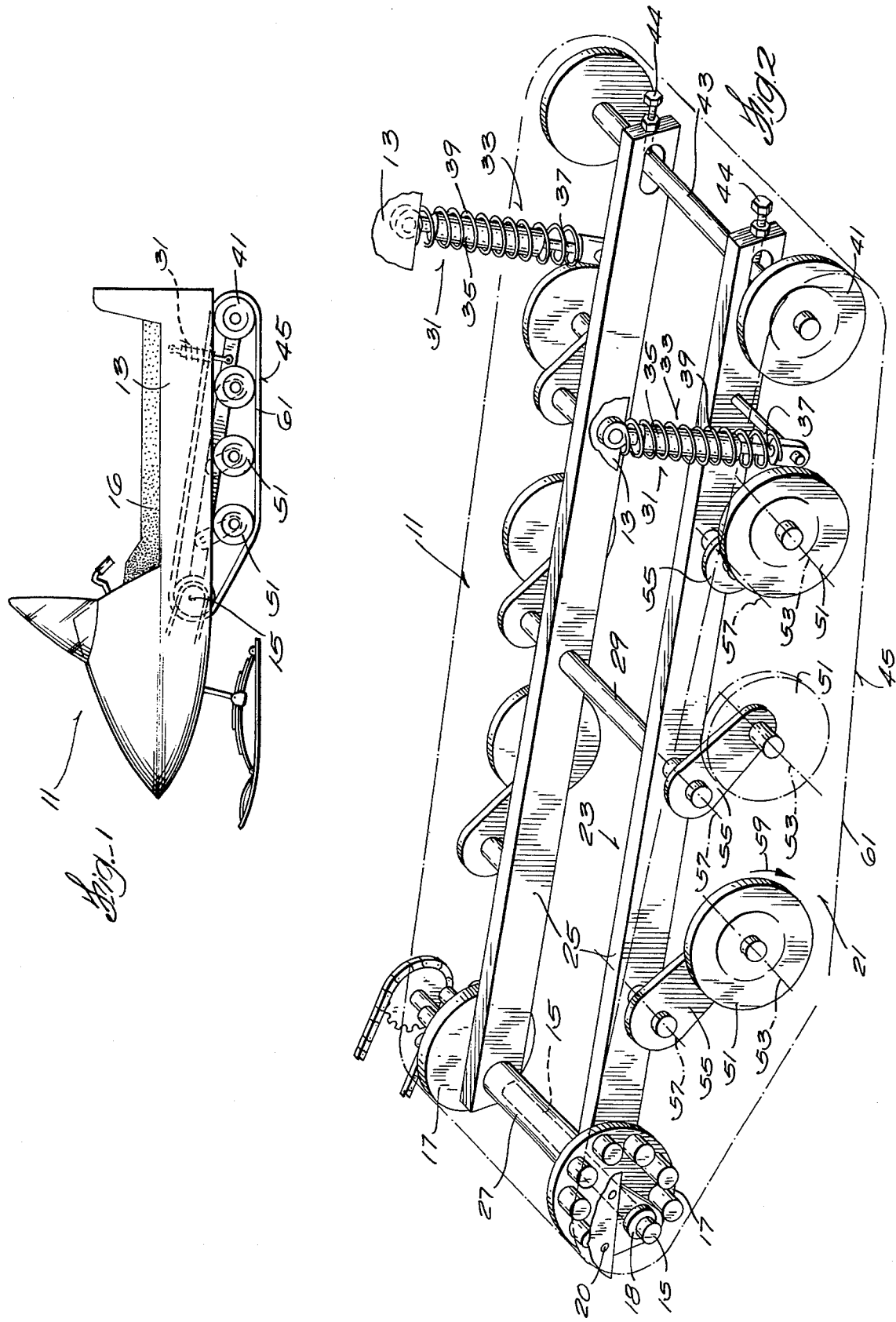

SNOWMOBILE TRACK SUSPENSION SYSTEM

BACKGROUND OF THE INVENTION

The invention relates generally to snowmobiles, and more particularly the invention relates to suspension systems for snowmobile tracks.

Attention is directed to the following U.S. Patents which disclose snowmobile track suspension systems:

Trapp, No. 3,446,303, issued May 27, 1969
Swenson, No. 3,485,312, issued Dec. 23, 1969
Hetteen, No. 3,613,810, issued Oct. 19, 1971
Brandli, No. 3,613,811, issued Oct. 19, 1971

Attention is also directed to U.S. Pat. application, Ser. No. 126,416, filed Mar. 22, 1971 and assigned to the assignee of this invention.

SUMMARY OF THE INVENTION

The invention provides a snowmobile track suspension system including a track supporting frame which is pivotally supported adjacent to its forward end about the axis of a track driving sprocket, which is restrained against pivotal movement by a resilient, energy absorbing connection between the rear of the track suspension frame and the snowmobile chassis, which otherwise supports the track or belt independently of the snowmobile chassis, and which includes a plurality of individually resiliently mounted bogie wheels spaced in the fore and aft direction of the track suspension frame.

In the illustrated and preferred construction, the track suspension frame comprises a pair of transversely spaced frame members which extend fore and aft, and which, at their forward ends, are interconnected by a tube which is telescoped over a sprocket bearing drive shaft and which can be detachably connected by suitable means to the snowmobile chassis. The resilient energy absorbing means comprises a combined spring and shock absorber assembly.

Also in accordance with the invention, the intermediate bogies or wheels are supported by mounting arms which are of decreased length from the front to the rear.

One of the principal objects of the invention is the provision of a track suspension system designed to allow increased vertical swinging travel of a track suspension frame relative to a snowmobile chassis, and thereby to prevent bottoming of the suspension which could result in an uncomfortable ride or injury to passengers.

Another of the principal objects of the invention is the provision of a track suspension frame which can be preassembled with a track or belt and which can be adjusted to provide proper belt tension prior to attachment to a snowmobile chassis, with such belt tensioning being accomplished entirely independently of the chassis.

Another of the principal objects of the invention is the provision of a track suspension system in which severe bumps are cushioned by a resilient energy absorbing connection between a track suspension frame and a snowmobile chassis and in which minor variations in terrain are accommodated by intermediate bogies, independently of displacement of the track suspension frame, so as thereby to provide a soft ride.

Another of the principal objects of the invention is the employment of a resilient energy absorbing device between the rear of a track suspension frame and a snowmobile chassis so as to decrease the possibility of back injury to the operator.

Other objects and advantages of the invention will become known by reference to the following description and accompanying drawings.

THE DRAWINGS

FIG. 1 is a side elevational view of one embodiment of a snowmobile embodying various of the features of the invention.

FIG. 2 is a schematic view of the track suspension system embodied in the snowmobile shown in FIG. 1.

Before explaining the invention in detail, it is to be understood that the invention is not limited in its application to the details of construction and arrangement of parts set forth in the following general description or illustrated in the accompanying drawings, since the invention is capable of other embodiments and of being practiced or carried out in various ways. Also it is to be understood that the phraseology or terminology employed herein is for the purpose of description and not of limitation.

GENERAL DESCRIPTION

Shown in the drawings is a snowmobile 11 including a main frame or chassis 13 rotatably supporting a drive shaft or forward axle 15 extending transversely of the frame and preferably adjacent to the front of a so-called "tunnel" (not shown) extending lengthwise of the snowmobile beneath the driver's seat 16. The front drive shaft or axle 15 can be driven by any suitable means and is preferably rotatably journalled on the chassis 13 by means including bearings 18 which can be readily assembled to the chassis 13 and disassembled from the chassis by suitable means such as bolts 20. Fixedly mounted on the drive shaft 15, within the tunnel, is one or more drive sprockets 17 which can be of any suitable construction.

In accordance with the invention, there is provided a track suspension system 21 which preferably extends in the tunnel and which is pivotally supported from the front for swinging movement about the axis of the drive shaft 15. While various other constructions could be employed in accordance with the invention, in the illustrated construction, the track suspension system comprises a track suspension frame 23 including two transversely spaced parallel frame members 25 which, adjacent to their forward ends, are pivotally mounted to the drive shaft 15. More specifically, the forward ends or portions of the frame members 25 are secured to each other by a tube or sleeve 27 through which the drive shaft 17 extends. Intermediate their ends, the frame members 25 are transversely connected by a second tube or brace 29. Accordingly, the frame members 25, together with the tube or sleeve 27 and the second tube or brace 29, provide a rigid frame.

Adjacent their rearward ends, the frame members 25 are each connected to the snowmobile chassis 13 by respective resilient, energy absorbing means 31 which serve to control or regulate and to limit pivotal movement of the track suspension frame 23 relative to the snowmobile chassis 13. While other arrangements could be employed, in the illustrated construction, such resilient, energy absorbing means comprises a hydraulic energy or shock absorber 33 including a cylinder 35 pivotally connected to one of the track suspension frame 23 and the snowmobile chassis 13, and a piston 37 operable in the cylinder 35 and pivotally connected to the other of the track suspension frame 23 and the snowmobile chassis 13. The shock absorber 33 can be of any suitable construction.

The resilient, energy absorption means 31 also includes a helical spring 39 which surrounds the shock absorber 33 and which, at its ends, is suitably connected to the track suspension frame 23 and to the snowmobile chassis 13. The shock absorber 33 provides energy absorption while the spring 39 provides resiliency.

Carried rearwardly by the track suspension frame 23 are one or more idler bogies or wheels 41 which are rotatably mounted on a common cross-shaft 43. Preferably, the cross-shaft 43 is journalled by the track suspension frame 23 through means 44 which can be adjusted in the fore and aft direction to facilitate training of a track 45 around the track suspension frame 23 and to provide proper track tension.

Also supported by the track suspension frame 23 are a plurality of intermediate bogies or wheels 51 which provide a secondary suspension system. While other arrangements are possible, in the illustrated construction, there are three intermediate trailing arm bogies 51 associated with each of the frame members 25. The three intermediate bogies or wheels 51 are spaced from one another in the fore and aft direction and each is supported on a mounting arm 55 for rotation about a first axis 53 extending transversely of the frame 23. In turn, each mounting arm 55 is pivotally mounted to one of the frame members 25 for pivotal or swinging movement about a second axis 57 transverse to the track suspension frame 23 and spaced from the bogie rotation axis 53. Suitable means such as torsion springs of metal or rubber (not shown) can be employed to resiliently bias the mounting arms 55 in the clockwise direction as shown by the arrow 59.

The distance between the axes 53 and 57 of the forward mounting arms 55 is greater than the distance between the axes 53 and 57 of the intermediate mounting arms 55 which, in turn, is greater than the distance between the axes 53 and 57 of the rearward mounting arms 55. Accordingly, the track suspension frame 23 is normally inclined upwardly and forwardly when the ground engaging run 61 of the track 45 is horizontal.

If desired, the transversely adjacent bogies or wheels could be joined by transverse axles depending upon the amount of stability or maneuverability desired. If desired, bogies or wheels arranged to the front and rear of oppositely extending pivot arms can be employed.

Trained about the drive sprocket 17 and about the idler bogies 41 and about the intermediate bogies 51 is the beforementioned track or endless belt 45. Any suitable flexible endless track or belt can be employed. As also previously indicated, the length of the belt 45 extending from the forward intermediate bogie or bogies 51 to the idler bogie or bogies 41 constitutes the ground engaging run 61.

Application of the track or belt 45 to the track suspension system 21 and proper tensioning of the belt 45 can be obtained by fore and aft adjustment of the cross-shaft 43 which supports the idler bogie or bogies 51 relative to the track suspension frame 23. Furthermore, as already indicated, such track application and tensioning can be accomplished entirely independently of the remainder of the snowmobile and prior to attachment of the drive shaft or forward axle 15 to the snowmobile chassis 13 and attachment of the resilient energy absorbing means 31 between the snowmobile chassis 13 and the track suspension frame 23. In this last regard, the resilient energy absorbing means 31 is located laterally outwardly of the side edges of the track 45.

Various of the features of the invention are set forth in the following claims.

I claim:

1. A snowmobile comprising a chassis, a drive shaft rotatably journalled by said chassis transversely thereof, a sprocket fixed on said drive shaft for common rotation therewith, a track suspension frame including a forward portion pivotally mounted from said chassis about the axis of said drive shaft and a rearward portion extending rigidly from said forward portion, resilient energy absorbing means extending between and connecting said rearward frame portion to said chassis to control pivotal movement of said track suspension frame relative to said chassis, an idler bogie supported from said rearward frame portion for rotation about a transverse axis, a plurality of intermediate bogies, means pivotally mounting said intermediate bogies from said track suspension frame in spaced relation to each other lengthwise of said track suspension frame for rotative movement independently of said track suspension frame, and an endless belt trained around said sprocket wheel, said idler bogie, and said intermediate bogies.

2. A snowmobile in accordance with claim 1 wherein said means pivotally mounting said intermediate bogies from said frame includes respective mounting arms pivotally supported by said track suspension frame about respective first axes and respectively pivotally supporting said intermediate bogies about respective second axes and further including means biasing said bogie mounting arms downwardly and forwardly relative to said chassis and wherein the length of a rearward one of said mounting arms between said first and second axes is less than the length of a forward one of said mounting arms between said first and second axes.

3. A snowmobile in accordance with claim 1 wherein said track suspension frame comprises a pair of transversely spaced frame members which extend fore and aft, and a tube telescoped over said drive shaft and interconnecting the forward portions of said frame members.

4. A snowmobile in accordance with claim 3 wherein said drive shaft is journalled by said chassis by means affording attachment to and detachment from said chassis of said track suspension frame.

5. A snowmobile in accordance with claim 1 wherein said resilient energy absorbing means comprises a combined spring and shock absorber assembly.

* * * * *